UNITED STATES PATENT OFFICE.

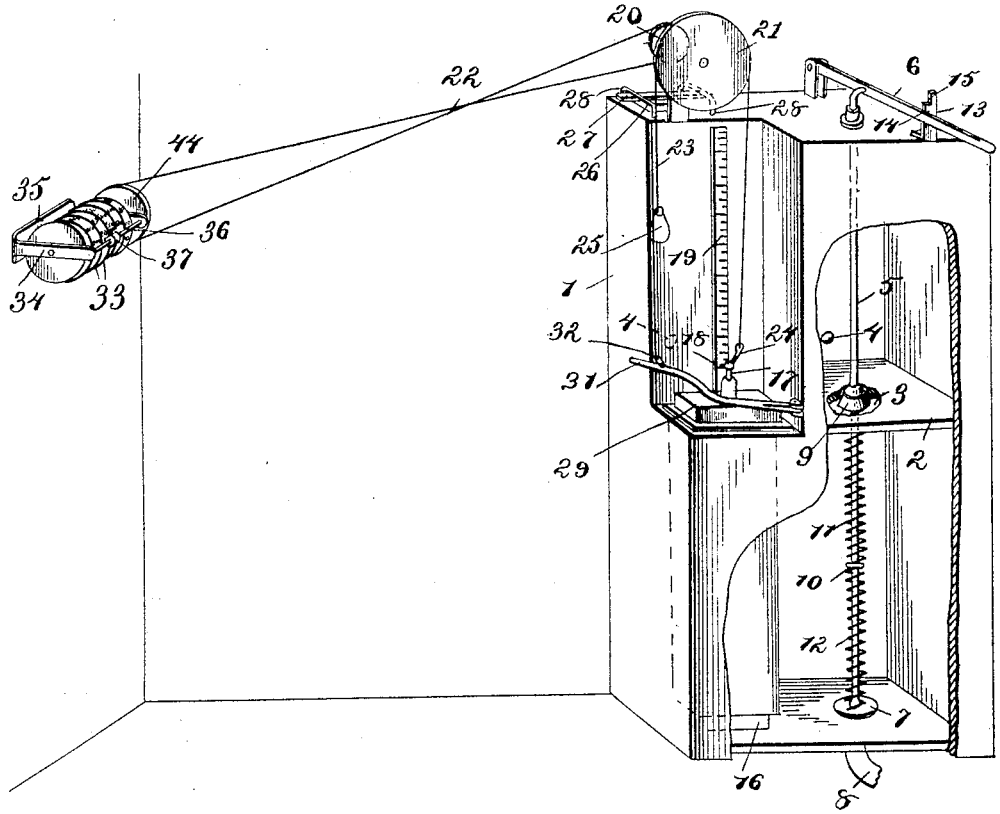

JACOB BARNARD ENGSTROM, OF MANCHESTER, IOWA.

REGISTERING MEASURING VESSEL.

SPECIFICATION forming part of Letters Patent No. 582,627, dated May 18, 1897.

Application filed January 6, 1896. Serial No. 574,564. (No model.)

*To all whom it may concern:*

Be it known that I, JACOB BARNARD ENGSTROM, residing at Manchester, in the county of Delaware and State of Iowa, have invented certain new and useful Improvements in Registering Measuring Vessels; and I do declare the following to be a full, clear, and exact description of the invention, such as will enable others skilled in the art to which it appertains to make and use the same, reference being had to the accompanying drawing, and to the figures of reference marked thereon, which forms a part of this specification.

My invention relates to devices for weighing or measuring liquids, and has for its principal object the weighing back of milk at creameries to patrons, although it can be used with any other freely-flowing liquids.

The invention consists in a device which is to be used for weighing or measuring the milk and delivering it to the patron and which may be connected with a register located at any convenient place in the creamery, and the weighing or measuring portion may be located at any other point as will be most convenient for the patron or the person whose duty it is to deliver the milk.

In the accompanying drawing is shown a perspective view of the entire apparatus with one side of the weighing or measuring portion removed to show the interior construction and other parts broken away.

Referring more particularly to the drawing, 1 indicates a tank or vessel of any suitable size or construction which is divided across the middle by a partition 2, which forms an upper and a lower chamber communicating with each other through an opening 3 in the partition. These compartments are preferably of the same size, so that when the upper one has been filled and is emptied into the lower one the lower one will be substantially filled when the upper one is empty. Two or more openings 4 (shown only in dotted lines in the drawing) lead into the upper chamber, so that by means of hose or other connections (not shown) the milk may be delivered to the upper chamber from the vat or other source of supply. These pipes or openings may be provided with any ordinary means for closing or opening them, but as they form no part of the invention I have not thought it necessary to show or further describe them.

Passing down through the upper chamber and through the opening 3 in the partition 2 is a rod 5, which is connected at its upper end to a lever 6, which is pivoted at one end on top of the tank. The lower end of the rod extends down to the bottom of the tank and is provided with a valve 7, which is adapted to close or open the outlet through which the milk is delivered to the customer through the pipe 8. The intermediate portion of the rod is provided with a valve 9, which is adapted to open or close the opening 3 through the partition 2. Between the two valves the rod is provided with a stop 10, against which the ends of two coiled springs 11 and 12 engage. The other end of the spring 12 engages with the valve at the bottom of the rod and tends to hold the valve firmly upon its seat, and the opposite end of the other spring 11 rests against the valve 9 and tends to force it against its seat on the under side of the partition 2.

Secured to the top of the tank, adjacent to the free end of the lever 6, is a shouldered standard 13, one notch or shoulder 14 of which is for holding the lever downward to the limit of its movement and the other one 15 is for holding it at its upward limit. When the upper compartment of the tank is being filled, the lever is forced up so as to engage with the notch 15, which will cause the valve 9 to close the opening in the partition of the tank and prevent the escape of the liquid. As soon as the compartment has been filled and it is desired to empty it into the lower compartment the lever is forced down to its utmost limit, which will release the valve from the bottom of the opening through the partition, and at the same time the outlet-valve will be forced against its seat and the lower compartment will be closed. After the contents have passed into the lower compartment the handle is raised, which opens the outlet-valve and permits the liquid to escape, and it also closes the valve 9 and places the upper compartment in condition to be filled again. When the handle rests intermediate the two notches, neither one of the springs are under compression, but as soon as it is desired to use the device the lever is moved in one direction or the other to close the desired valve. By this construction the elasticity of neither one of the springs is impaired, and each one will always exert its greatest pressure when its respective valve is upon its seat. By arranging the compartments with their valves in this relation to each other it is evident that as soon as one valve is raised to close the opening in the partition between the compartments the other one is opened, and the upper compartment can be filled at the same time that the lower one is being emptied, thereby saving time in operating the device.

As the liquid must be weighed or measured before being delivered to the customer, I prefer to accomplish this object after it has passed into the second compartment, and for that purpose I provide a float 16, which will normally rest upon the surface of the liquid and be carried up by it. The float is provided with a rod 17, which is preferably provided at its upper end with a pointer 18, which is caused to pass in front of a scale 19 until the compartment is entirely or partly filled, as the case may be, depending upon the amount of liquid to be delivered. By arranging the indicating-point upon the scale to correspond with or indicate any certain aliquot part of the cubic contents of the lower compartment it is evident that as the float rises the pointer will indicate the correct amount of liquid in the compartment.

As the tank is preferably made so small as to only hold a small amount of the milk delivered to any one customer, it is evident that the lower compartment must be filled and emptied several times, which necessitates that some record be kept of the number of times that the float is moved up and down to determine the quantity of milk passing through the lower compartment. For this purpose the upper portion of the tank may be provided with two grooved wheels 20 and 21, one of which is connected with the register by means of a belt 22, and the other one has a cord 23 passed over it, one end of the rod being connected with the top of the rod 17 by means of an eye 24 and the other end being provided with a counterpoise 25, a trifle less than the weight of the float, so that as the float passes down with the fall of the surface of the liquid as it is passing out of the tank the weight will be carried up toward the wheel. It is preferable to make the size of this wheel and the weights of the float and its counterpoise sufficient to rotate the wheel as the float is being carried upward by the rise of the liquid in the compartment. Otherwise the register would not be operated correctly and the quantity of milk delivered would not be known.

In the care of milk it is very necessary that the vessels through which it passes should be kept very clean and free from particles of milk which are soured or rancid, which would soon spoil any milk that came in contact therewith. Therefore to render free access to both compartments easy and uninterrupted I provide the top of the tank with an opening which is closed by a lid or cover 26, provided with a cross-piece 27, which fits under two staples 28 28. Access is had to the lower compartment through an opening in one corner of the partition 2, through which a float-case 29 is inserted. By making an offset in the side of the tank extending from the partition to the top corresponding with the size of the hole through the partition a recess is formed for the top of the float-casing and also the scale 19, projecting from its top. As the lower compartment is as large as the upper one, it is impossible to fill the lower compartment so full that the liquid will escape through this opening. To prevent the buoyancy of the liquid from raising the float-casing off its seat and thereby disarranging the parts, I prefer to hinge a locking-lever 31 at one side of the recess in the tank and have its free end engage with a notch or catch 32 upon the opposite side, with its intermediate portion resting against the top of the casing. When it is desired to remove the casing for cleaning it and also giving access to the interior of the lower compartment, this lever is swung around from under the latch, which will permit of the casing being moved upwardly within the recess of the tank until its lower end is free from the tank and can be removed and cleansed. By making the casing and float rectangular in cross-section it will be impossible for the pointer at the upper end of the rod to get out of its position relatively to the scale and the wheel at the top of the tank, and by making the pointer and the eye at the upper end of the rod detachable they can be removed from the rod and the rod and float then removed from the casing for more thorough cleansing, after which the parts can be reassembled.

The register may be of any desired form, but I have shown a form I prefer, in which 35 is the base, which can be secured to the wall at any desired point and is provided with standards 34. Journaled between the standards is a drum 33, which is rotated by the band 22 from the wheel 20 to the wheel 44. A traveling indicator 37 is mounted on a rod 36 adjacent to the periphery of the cylinder and moves upon the rod as the cylinder is rotated.

Having described my invention, I claim—

1. The combination, with a tank, provided with an upper and a lower compartment, the partition between the compartments being provided with an opening, and the upper compartment being recessed above said opening, a removable casing through the opening, the top of which is provided with a scale, a float in the lower portion of the casing, a rod projecting from the float through the top of the casing, and means for locking the casing within the opening, substantially as set forth.

2. The combination, with a tank, provided with an upper and a lower compartment, the partition between said compartments being provided with a rectangular hole at one corner, and the upper compartment being provided with a recess extending above and corresponding in shape with said opening, one wall of said recess being provided with a hinge and the opposite wall with a catch, a removable casing within the opening, the top of which is provided with a scale, a float within the lower part of the casing, a rod connected with the float and projecting through the top of the casing, the upper end of which is provided with a pointer adjacent to the scale, and a locking-lever secured to the hinge at one end and adapted to engage with the latch at the opposite end, whereby the intermediate portion is adapted to engage with the top of the casing and hold it in position, substantially as set forth.

3. The combination, with a tank, provided with an upper and a lower compartment, of a casing in the lower compartment, provided with a scale, a float within the casing, a rod connected to the float and projecting through the top of the casing adjacent to the scale, a pointer and an eye on the upper end of the rod, a wheel journaled at the top of the tank, a cord connected with the eye and passed over the wheel, and a counterpoise at the end of the cord, said counterpoise being of a less weight than the float, substantially as set forth.

In testimony whereof I affix my signature in presence of two witnesses.

JACOB BARNARD ENGSTROM.

Witnesses:
H. F. ARNOLD,
CALVIN YORAN.